United States Patent
Saeki et al.

(10) Patent No.: US 7,591,642 B2
(45) Date of Patent: Sep. 22, 2009

(54) MOLD FOR OPTICAL COMPONENT AND METHOD FOR MOLDING OPTICAL COMPONENT

(75) Inventors: Tatsuhiko Saeki, Odawara (JP); Masanori Utsugi, Saitama (JP)

(73) Assignees: FUJIFILM Corporation, Tokyo (JP); Fujinon Corporation, Saitama (JP)

( * ) Notice: Subject to any disclaimer, the term of this patent is extended or adjusted under 35 U.S.C. 154(b) by 188 days.

(21) Appl. No.: 11/715,381

(22) Filed: Mar. 8, 2007

(65) Prior Publication Data

US 2007/0210466 A1 Sep. 13, 2007

(30) Foreign Application Priority Data

Mar. 9, 2006 (JP) ............................. 2006-064750

(51) Int. Cl.
*B29D 11/00* (2006.01)
(52) U.S. Cl. ..................... 425/408; 425/410; 425/412; 425/808; 425/400
(58) Field of Classification Search ................. 425/400, 425/406, 408, 577, 808, 410, 412; 264/1.32, 264/1.1
See application file for complete search history.

(56) References Cited

U.S. PATENT DOCUMENTS

| | | | | |
|---|---|---|---|---|
| 2,233,057 A * | 2/1941 | Luce | ................ | 65/305 |
| 2,304,984 A * | 12/1942 | Wood | ................ | 264/275 |
| 3,555,606 A * | 1/1971 | Hedgewick | ................ | 425/556 |
| 4,115,505 A * | 9/1978 | Metabi | ................ | 264/242 |
| 4,680,149 A * | 7/1987 | Rawlings et al. | ................ | 264/2.1 |
| 5,110,278 A * | 5/1992 | Tait et al. | ................ | 425/175 |
| 5,733,585 A * | 3/1998 | Vandewinckel et al. | . | 425/192 R |
| 7,175,413 B1 * | 2/2007 | Graham | ................ | 425/441 |
| 7,214,116 B2 * | 5/2007 | Takekuma | ................ | 445/24 |
| 2001/0053395 A1 * | 12/2001 | Hosoe | ................ | 425/408 |
| 2004/0050104 A1 * | 3/2004 | Ghosh et al. | ................ | 65/36 |
| 2006/0145369 A1 * | 7/2006 | Lawton et al. | ................ | 264/1.32 |
| 2006/0145371 A1 * | 7/2006 | Lawton et al. | ................ | 264/1.32 |
| 2007/0212438 A1 * | 9/2007 | Saeki et al. | ................ | 425/408 |

FOREIGN PATENT DOCUMENTS

| JP | 62094311 A | * | 4/1987 |
|---|---|---|---|
| JP | 2001-341134 A | | 12/2001 |
| JP | 2003231165 A | * | 8/2003 |
| JP | 2004262734 A | * | 9/2004 |
| JP | 2007238391 A | * | 9/2007 |

* cited by examiner

*Primary Examiner*—Philip C Tucker
*Assistant Examiner*—Dimple N Bodawala
(74) *Attorney, Agent, or Firm*—Sughrue Mion, PLLC (57) ABSTRACT

A mold for an optical component is provided in which a first tapered surface is provided in a first mold while a second tapered surface is provided in a second mold. In the mold for the optical component, a curved surface distance which is a distance between a first mold curved surface and a second mold curved surface is greater than a lens thickness which is a distance between a first lens surface and a second lens surface in a state where the second tapered surface is contact with the first tapered surface. Moreover, the second tapered surface moves to a position where the curved surface distance is equal to the lens thickness, to elastically transform the first mold and fit onto the first tapered surface.

9 Claims, 5 Drawing Sheets

MOLD FOR OPTICAL COMPONENT AND METHOD FOR MOLDING OPTICAL COMPONENT

CROSS REFERENCE TO RELATED APPLICATIONS

This application claims the foreign priority benefit under Title 35, United States Code, §119(a)-(d) of Japanese Patent Application No. 2006-064750, filed on Mar. 9, 2006 in the Japan Patent Office, the disclosure of which is herein incorporated by reference in its entirety.

BACKGROUND OF THE INVENTION

1. Field of the Invention

The present invention relates to a technical field of pressing heat-softened material to mold an optical component using a mold divided into a first mold (a lower mold) and a second mold (an upper mold) which face each other, more specifically, a mold for an optical component and a method for molding an optical component to achieve a molding process with high accuracy.

2. Description of the Related Art

In recent years, a highly accurate molding process is required for an optical lens (an optical component) with advanced functions has been developed. Therefore, studies of molding techniques are promoted to meet the requirement. In particular, to mold an optical lens, a technology for highly accurately centering a mold (a first mold and a second mold) which is repeatedly closed and opened is one of essential molding technologies.

Here, to center a mold means to align rotational symmetry axes of the first mold (a lower mold) for molding a first lens surface of the optical lens and the second mold (an upper mold) for molding a second lens surface of the optical lens in a state where the mold is closed.

To achieve centering of a mold with high accuracy, conventionally, a technology is well-known in which a tapered surface is provided on each of the first mold and the second mold and the tapered surfaces fit onto each other when the first mold and the second mold are in a state where the mold is closed (See JP2001-341134A).

SUMMARY OF THE INVENTION

However, in the conventional centering method using the tapered surfaces, a press stroke of the upper mold with respect to the lower mold is determined at a position where the tapered surfaces contact each other. Therefore, there is a problem that it is impossible to control thickness of the optical lens and make the optical lens as thick as desired.

Moreover, immediately after the mold is closed, a state of lens material changes from a high temperature state where the lens material is softened to a low temperature state where the lens material is solidified. At this time, the press stroke of the upper mold may need to be finely adjusted in such a way that the upper mold moves in a pressing direction to follow the thermal contraction of the lens material in a state where the mold is closed corresponding to the thermal contraction of the mold and the lens material.

However, in the above-mentioned conventional technology, it is impossible to finely adjust the press stroke due to the above-mentioned reason in a state where the tapered surfaces fit onto each other and the mold is closed.

Accordingly, there has been a problem that the accuracy in the thickness direction is sacrificed according to the conventional molding technique of the optical lens in which tapered surfaces fit onto each other, to improve the centering accuracy of the optical lens.

The present invention was devised to solve such a problem. The present invention provides a mold for an optical component and a method for molding an optical component to improve centering accuracy of an optical lens (an optical component), as well as accuracy in a thickness direction of the optical component.

To solve the above-mentioned problem, in one aspect of the present invention, there is provided a mold for an optical component including a first mold which includes a first mold curved surface to mold a first lens surface of the optical component, a second mold which includes a second mold curved surface to mold a second lens surface of the optical component, a first tapered surface which is rotationally symmetric about a first symmetry axis about which the first mold curved surface is rotationally symmetric, and a second tapered surface which is rotationally symmetric about a second symmetry axis about which the second mold curved surface is rotationally symmetric, and the second tapered surface which fits onto the first tapered surface in such a way that the first symmetry axis matches the second symmetry axis, the mold for the optical component in which a curved surface distance which is a distance between the first mold curved surface and the second mold curved surface is greater than a lens thickness which is a distance between the first lens surface and the second lens surface in a state where the second tapered surface is in contact with the first tapered surface, and the mold for the optical component in which the second tapered surface moves to a position where the curved surface distance is equal to the lens thickness, to elastically transform the first mold and fit onto the first tapered surface.

In the mold for the optical component, the first tapered surface may be provided in a third mold which is detachably attached to the first mold.

In the mold for the optical component, the first mold fits in the third mold with the tapered surface in the first mold in contact with the tapered surface in the third mold.

In the mold for the optical component, a plurality of slits may be formed on the first tapered surface.

In the mold for the optical component, a plurality of protrusions which support the second tapered surface may be arranged in the first tapered surface.

In another aspect of the present invention, there is provided a method for molding an optical component in which a heat-softened material is inserted and pressed between a first mold and a second mold, including the steps of placing the material in the first mold which includes a first tapered surface, pressing the material with the second mold which includes a second tapered surface, making the second tapered surface contact the first tapered surface, and further pressing the second mold to elastically transform the first mold in such a way that the first tapered surface fits onto the second tapered surface.

According to the present invention with such a structure, the heat-softened material is inserted between the first mold and the second mold, and then the mold is closed. Thus, portions of the material contacting with the first mold curved surface and the second mold curved surface are respectively molded into the first lens surface and the second lens surface. In addition, the first tapered surface fits onto the second tapered surface so that the first lens surface and the second lens surface are centered.

Moreover, in a state where the first tapered surface fits onto the second tapered surface (the first tapered surface and the second tapered surface are centered), the first mold is elastically transformed so that a press stroke of the second mold is further finely adjusted. Therefore, it is possible to adjust the curved surface distance between the first mold curved surface and the second mold curved surface as needed.

The method for molding the optical component may further include the step of cooling the pressed material, wherein the second mold is pressed to cause the first tapered surface to be further elasticity transformed and fit onto the second tapered surface.

BRIEF DESCRIPTION OF THE DRAWINGS

The above and other aspects, other advantages and further features of the present invention will become more apparent by describing in detail illustrative, non-limiting embodiments thereof with reference to the accompanying drawings, in which.

DESCRIPTION OF THE PREFERRED EMBODIMENTS

Here will be described embodiments of the present invention, referring to the accompanying drawings, below.

Referring to FIGS. 1A-1E, there will be described a mold for an optical lens (an optical component) according to an embodiment of the present invention.

Figures 1A, 1B:
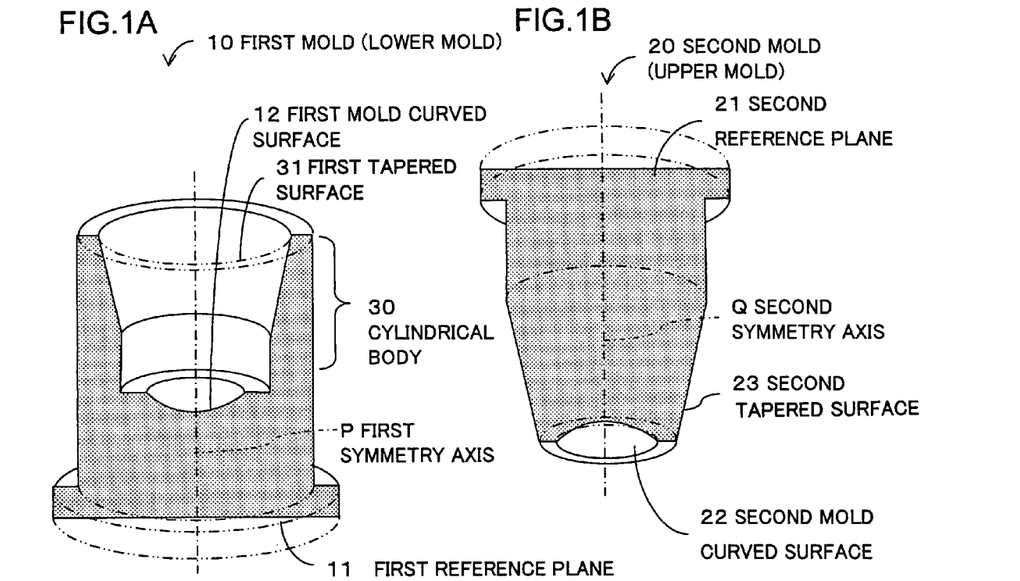
FIG. 1A is a vertical sectional view showing a lower mold (a first mold) of a mold for an optical lens according to an embodiment of the present invention.
FIG. 1B is a vertical sectional view showing an upper mold (a second mold) of a mold for the optical lens according to the embodiment of the present invention.

The mold for the optical lens according to the embodiment includes a first mold (a lower mold) 10 and a second mold 20 (an upper mold) respectively shown in FIGS. 1A and 1B.

As shown in FIG. 1A, the first mold (the lower mold) 10 includes a first reference plane 11, a first mold curved surface 12, and a first tapered surface 31 which share a first symmetry axis P with each other as a rotational symmetry axis. In general, to produce such a structure, a workpiece is fixed to a main axis (which matches the first symmetry axis P) of a lathe machine, rotated, and machine with a bit which is placed on a carriage and moves back and forth and left and right.

The first reference plane 11 is formed on a plane orthogonal to the first symmetry axis P. The first reference plane 11 is a portion to be placed on a fixed plate 57 (see FIGS. 4A-4C), which will be described later.

Figure 1C:
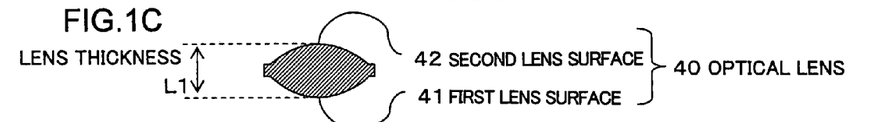
FIG. 1C is a vertical sectional view showing the optical lens according to the embodiment of the present invention.

The first mold curved surface 12 whose shape matches a shape of a first lens surface 41 of the optical lens 40 shown in FIG. 1C is a curved surface to mold the first lens surface 41.

The first tapered surface 31 is formed on an inner peripheral surface of a cylindrical body 30 which is formed by a portion of the lower mold 10 which protrudes upward above the first mold curved surface 12. In addition, the first tapered surface 31 forms a cone shape, that is, the closer to the upper end of the first taper surface 31 a position becomes, the larger the inner diameter of the first tapered surface 31 at the position becomes.

As shown in FIG. 1B, the second mold (the upper mold) 20 includes a second reference plane 21, a second mold curved surface 22, and a second tapered surface 23 which share a second symmetry axis Q with each other as a rotational symmetry axis. Such a structure is obtained by cutting with the lathe machine similarly to the first mold (the lower mold) 10.

The second reference plane 21 is formed on a plane orthogonal to the second symmetry axis Q.

The second mold curved surface 22 whose shape matches a shape of the second lens surface 42 is a curved surface to mold a second lens surface 42 of the optical lens 40 shown in FIG. 1C.

The second tapered surface 23 forms a cone shape on an outer peripheral surface of the upper mold 20, so as to be identical with and fit onto the first tapered surface 31.

Figure 1D:
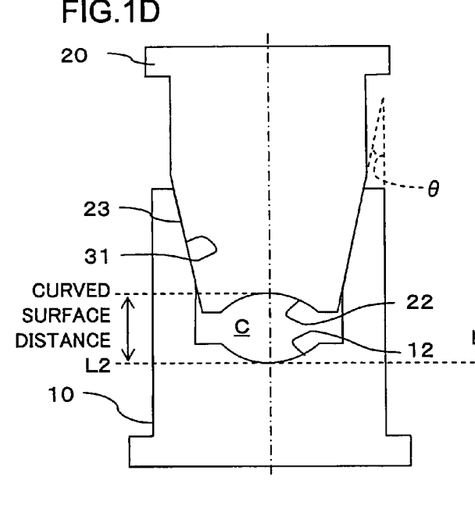
FIG. 1D is a vertical sectional view showing a state where a tapered surface of the lower mold (the first mold) contacts a tapered surface of the upper mold (the second mold)
Figure 1E:
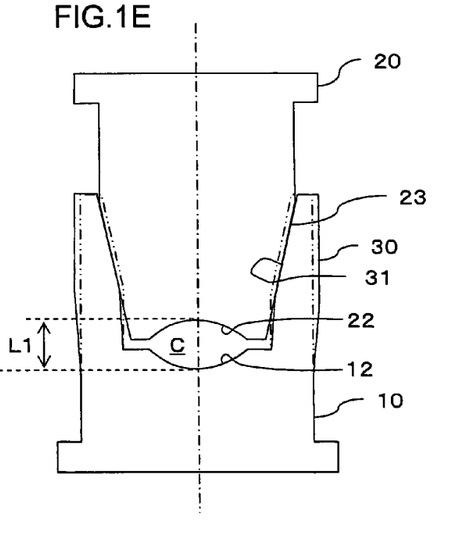
FIG. 1E is a vertical sectional view showing a state where a cylindrical body in the lower mold is elastically transformed so that a press stroke of the upper mold is adjusted.

Next, FIGS. 1D and 1E show "a state where a mold is closed" of the mold for the optical lens, in which the first mold (the lower mold) 10 fits onto the second mold (the upper mold) 20 on the first tapered surface 31 and the second tapered surface 23 in such a way that the first tapered surface 31 fits onto the second tapered surface 23. Here, a cavity C shown in FIG. 1E is formed in the same shape as the optical lens 40 shown in FIG. 1C.

As shown in FIG. 1D, a curved surface distance L2 which is a distance between the first mold curved surface 12 and the second mold curved surface 22 is greater than a lens thickness L1 which is a distance between the first lens surface 41 and the second lens surface 42 in a state where the second tapered surface 23 is in contact with the first tapered surface 31.

Then, since the first symmetry axis P is aligned to be identical with the second symmetry axis Q in this state, it is recognized that the lower mold 10 and the upper mold 20 are centered.

Moreover, as shown in FIG. 1E, the upper mold 20 is further pressed to change the press stroke of the upper mold 20 with respect to the lower mold 10 so that both of the upper mold 20 and the lower mold 10 fit onto each other. In other words, the cylindrical body 30 in the lower mold 10 is elastically transformed and widened from a dashed line to a solid line shown in the FIG. 1E, and the position of the second tapered surface 23 is finely adjusted to a position where the first curved surface distance L2 is equal to the lens thickness L1.

Here, an adjustment amount (equivalent to a thickness differential of L2−L1 in FIGS. 1A-1E) of a press stroke to further shorten the curved surface distance from the curved surface distance L2 shown in FIG. 1D is preferably set within a predetermined margin so as to mold an optical component with high accuracy.

The adjustment amount of the press stroke is desired to be set within a margin from 50 μm to 0.01 μm. Therefore, a taper angle θ is desired to be set between 0.01° and 20°, more preferably between 0.5° and 5° so that the cylindrical body 30 is elastically transformed in this way.

The smaller the taper angle θ is the greater a horizontal force is with respect to a vertical force. Thus, performance of centering is improved. However, when the taper angle θ is smaller than 0.01°, it is difficult to secure processing accuracy so that the centering accuracy may be reduced. Moreover, when the taper angle θ is greater than 20°, it is impossible to obtain the desired adjustment amount of the press stroke.

By the way, as shown in FIG. 1E, to elastically transform means to transform to an extent that the original shape of the cylindrical body 30 indicated by the dashed line is recovered when the upper mold 20 is removed even after the upper mold is inserted and the cylindrical body 30 is transformed. Moreover, an extent by which the original shape is recovered means an extent by which centering accuracy of the lower mold 10 and the upper mold 20 is not reduced even after the mold for the optical lens is repeatedly "opened" and "closed".

SUS304, SKH (high-speed steel), and so on are examples of materials for the mold, which secures such an elastic deformation in a wide range at a high temperature at which the material of the optical lens 40 is softened.

Referring to FIGS. 2A-2D, molds of optical lenses according to other embodiments of the present invention will be described.

Figure 2A:
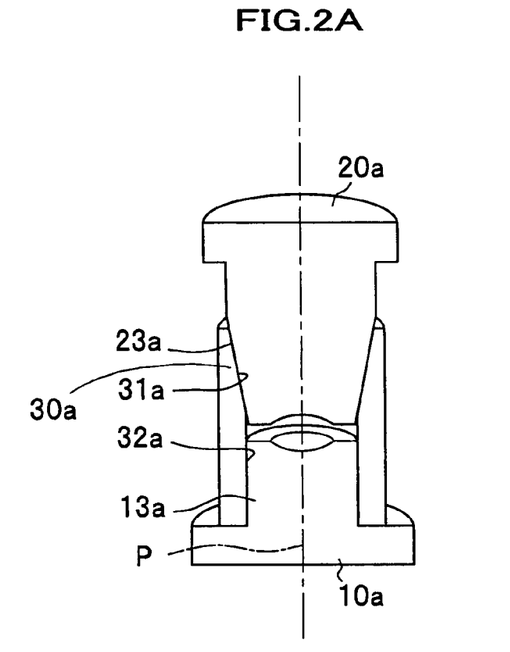
FIG. 2A is a vertical sectional view showing another embodiment of a mold for an optical lens according to the present invention.

A mold for an optical lens shown in FIG. 2A has a third mold 30a. A first tapered surface 31a onto which a second tapered surface 23a fits forms a part of the inner surface of the third mold 30a. Moreover, the third mold 30a is fixed in such a way to share a first symmetry axis P as a common rotational symmetry axis with a lower mold 10a. More specifically, an inner peripheral surface 32a is formed on a different part from the first tapered surface 31a in the inner surface of the third mold 30a. The inner peripheral surface 32a is detachably attached to an outer peripheral surface of the lower mold 10a, in a relatively fixed position. Moreover, the third mold 30a may be attached to the lower mold 10a by a fastening member such as a bolt.

Figure 2B:
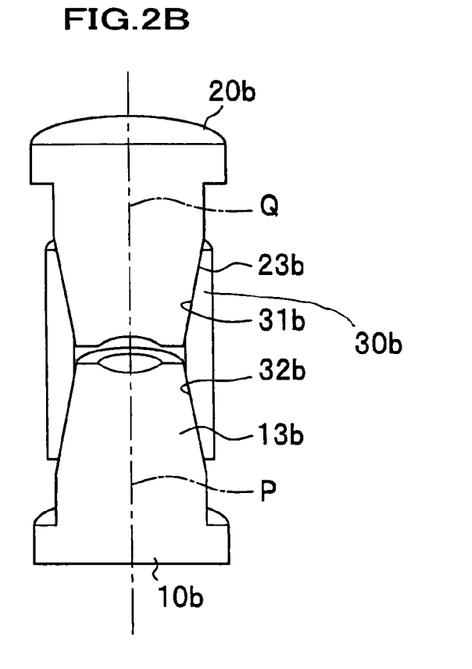
FIG. 2B is a vertical sectional view showing another embodiment of a mold for an optical lens according to the present invention.

Moreover, as shown in FIG. 2B, a mold for an optical lens may have a third mold 30b which is arbitrarily detachable also from a lower mold 10b. In the third mold 30b, a first tapered surface 31b onto which a second tapered surface 23b fits is formed. In addition, a tapered surface 32b onto which a tapered surface 13b in the lower mold 10b fits is provided.

In such a structure, the lower mold 10b and the upper mold 20b respectively fit onto the tapered surfaces 32b and 31b in both ends of the third mold 30b so that the first symmetry axis P matches the second symmetry axis Q. In addition, the cylindrical body 30b is elastically transformed to adjust a press stroke of the upper mold 20b.

Figure 2C:
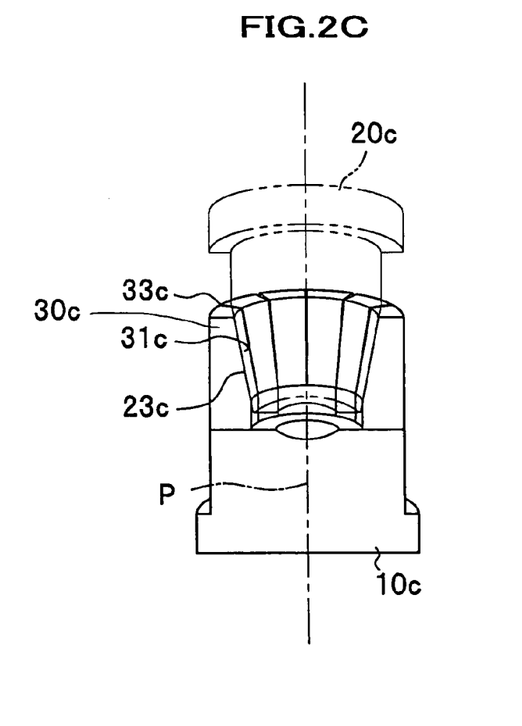
FIG. 2C is a vertical sectional view showing another embodiment of a mold for an optical lens according to the present invention.

Moreover, in a mold for an optical lens shown in FIG. 2C, a plurality of slits 33c are provided with equal intervals in a first tapered surface 31c which a second tapered surface 23c fits. Thus, with these slits 33c, an upper mold 20c fits in the first tapered surface 31c to press and widen spaces in the slits 33c so as to increase an adjustable amount of a press stroke of an upper mold 20c.

Figure 2D:
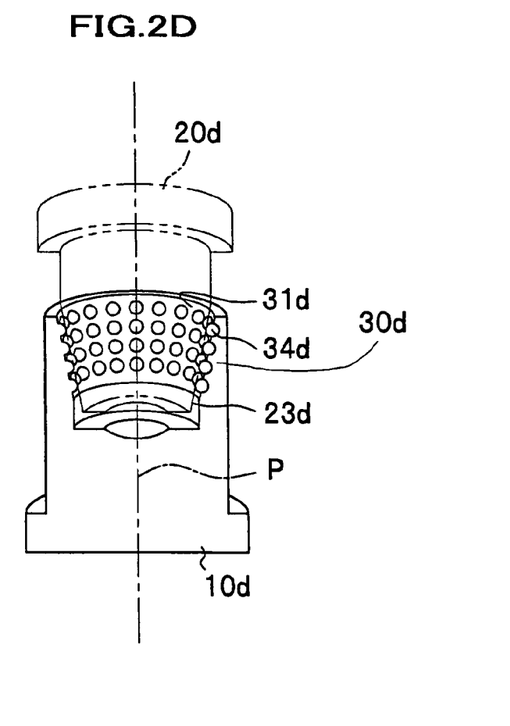
FIG. 2D is a vertical sectional view showing another embodiment of a mold for an optical lens according to the present invention.

Moreover, in a mold for an optical lens shown in FIG. 2D, a great number of protrusions 34d are arranged in a first tapered surface 31d which a second tapered surface 23d fits, in order to support the second tapered surface 23d. The protrusions 34d are thus arranged to support the second tapered surface 23d with their tops. Therefore, when the upper mold 20d fits onto the first tapered surface 31d, the tops of the protrusions 34d are intensively elastically transformed so as to increase an adjustable amount of a press stroke of the upper mold 20d.

The plural protrusions 34d are not limited to the spheres embedded in the first tapered surface 31d shown in FIG. 2D. However, the surface of the first tapered surface 31d may be waved. In other words, anyone which can support the second tapered surface 23d with a plurality of points can be applied as the protrusions 34d.

Referring to FIGS. 3A-3G, there will be described a method for molding an optical lens (an optical component) according to an embodiment of the present invention.

Figure 3A:
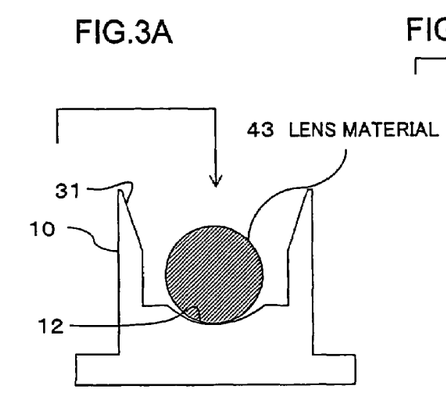
FIG. 3A shows a process step of a method for molding an optical lens according to an embodiment of the present invention illustrated by a cross sectional view of a lower mold (a first mold), an upper mold (a second mold), and the optical lens.
Figure 3B:
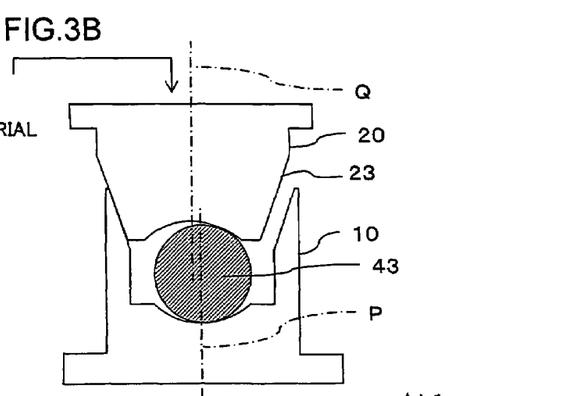
FIG. 3B shows a process step of the method for molding the optical lens according to the embodiment of the present invention illustrated by a cross sectional view of the lower mold (the first mold), the upper mold (the second mold), and the optical lens.

First of all, as shown in FIG. 3A, a heat-softened lens material 43 (a material) is placed on the first mold curved surface 12 of the first mold (the lower mold) 10. Next, as shown in FIG. 3B, the second mold 20 is additionally placed on the lens material 43 so that the lens material 43 is pressed. By the way, in this state, the first symmetry axis P of the lower mold 10 is not identical with the second symmetry axis Q of the upper mold 20.

Figure 3C:
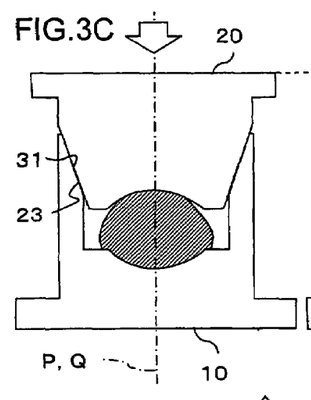
FIG. 3C shows a process step of the method for molding the optical lens according to the embodiment of the present invention illustrated with a cross sectional view of the lower mold (the first mold), the upper mold (the second mold), and the optical lens.

However, as shown in FIG. 3C, when the second mold 20 further continues to be pressed, the first tapered surface 31 comes in contact with the second tapered surface 23 while the first symmetry axis P matches the second symmetry axis Q.

Figure 3D:
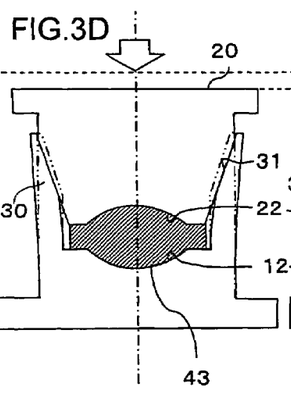
FIG. 3D shows a process step of the method for molding the optical lens according to the embodiment of the present invention illustrated with a cross sectional view of the lower mold (the first mold), the upper mold (the second mold), and the optical lens.

As shown in FIG. 3D, the second mold 20 is further pressed so as to additionally finely adjust the press stroke by ΔL1, elastically transform the cylindrical body 30, and shorten the curved surface distance between the first mold curved surface 12 and the second mold curved surface 22. At this point, a shape of the optical lens 40 of the heat-softened lens material 43 has been approximately determined. The lower mold 10 and the upper mold 20 may also be designed in such a way that the shape of the optical lens 40 of the heat-softened lens material 43 is determined in a state where the cylindrical body 30 is not elastically transformed as shown in FIG. 3D.

Figure 3E:
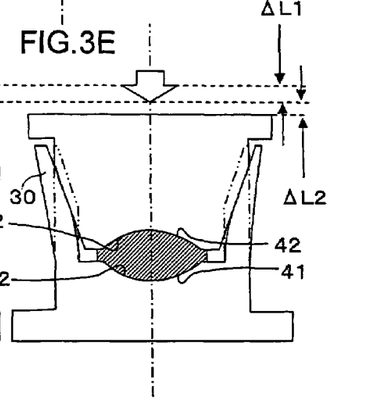
FIG. 3E shows a process step of the method for molding the optical lens according to the embodiment of the present invention illustrated with a cross sectional view of the lower mold (the first mold), the upper mold (the second mold), and the optical lens.

Next, the heat-softened lens material 43 needs to be cooled and solidified to be taken out as the optical lens 40. By the way, the first mold curved surface 12, the second mold curved surface 22, and the lens material 43 change in size due to thermal contraction in the cooling process. Therefore, as shown in FIG. 3E, it is necessary to prevent the first mold curved surface 12 and the second mold curved surface 22 from being separated respectively from the first lens surface 41 and the second lens surface 42 so that process accuracy is not reduced. For this reason, the second mold 20 may be further pressed as needed to follow the thermal contraction in the cooling process. Accordingly, the press stroke may be additionally adjusted by ΔL2 and the cylindrical body 30 is further elastically transformed so that the first tapered surface 31 fits onto the second tapered surface.

Figure 3F:
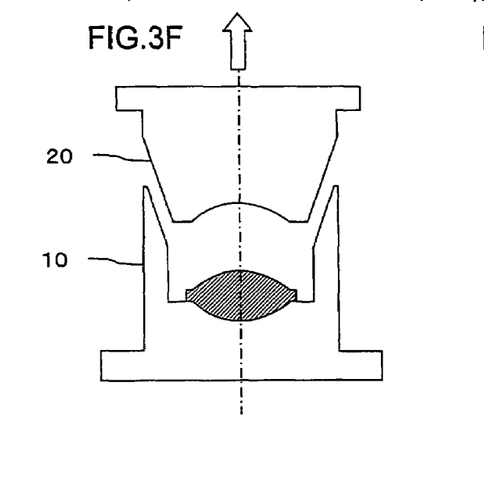
FIG. 3F shows a process step of the method for molding the optical lens according to the embodiment of the present invention illustrated with a cross sectional view of the lower mold (the first mold), the upper mold (the second mold), and the optical lens.
Figure 3G:
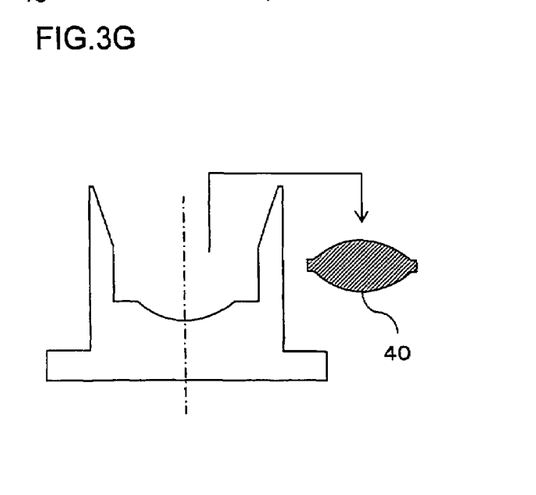
FIG. 3G shows a process step of the method for molding the optical lens according to the embodiment of the present invention illustrated with a cross sectional view of the lower mold (the first mold), the upper mold (the second mold), and the optical lens.

Through process steps shown in FIGS. 3A-3E, when temperature lowers enough and the lens material 43 is solidified, a process step to close the mold ends. Next, as shown in FIG. 3F, either one of the lower mold 10 or the upper mold 20 is detached to open the mold. Then, the optical lens 40 is taken out (FIG. 3G).

After optical lens 40 is taken out, returning to the process step shown in FIG. 3A, another lens material 43 is placed between the lower mold 10 and the upper mold 20 so that the optical lenses 40 are repeatedly mass-produced.

Next, referring to FIGS. 4A-4C, there will be described an embodiment of a presser which is applicable to a method for molding an optical lens according to the present invention.

Figure 4A:
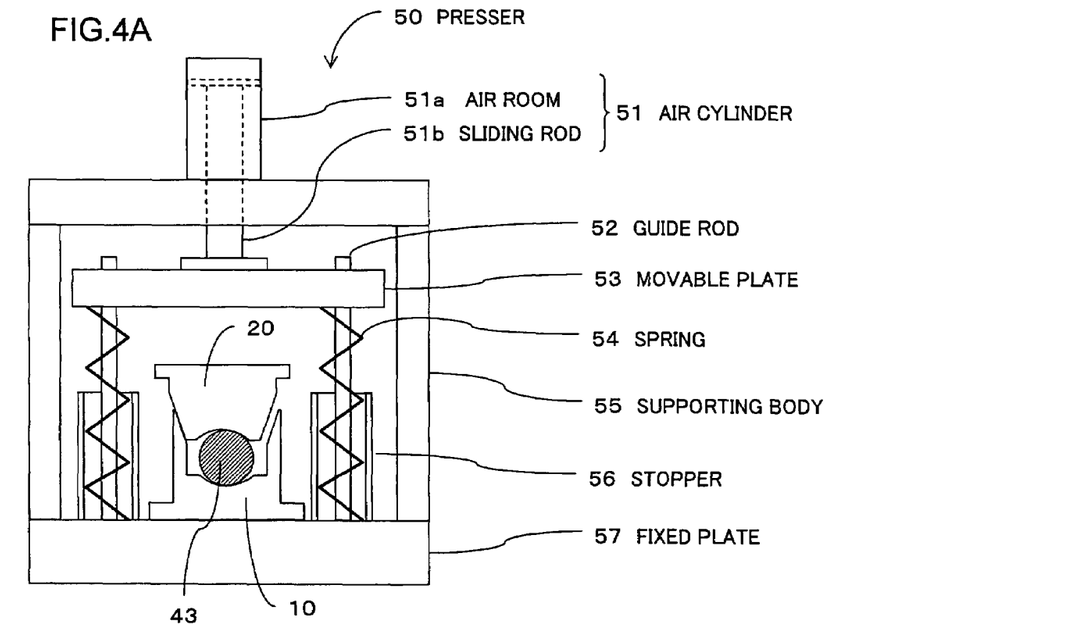
FIG. 4A shows an embodiment of a presser applicable to a method for molding an optical lens according to the present invention.

As shown in FIG. 4A, the presser 50 according to the embodiment includes an air cylinder 51, a guide rod 52, a movable plate 53, a spring 54, a supporting body 55, a stopper 56, and a fixed plate 57. The presser 50 with such a structure provides pressing force necessary to transform a heat-softened lens material 43 and closes the lower mold 10 and the upper mold 20 with a single press stroke so that an optical lens 40 is molded.

The air cylinder 51, which includes an air room 51a and a sliding rod 51b, is fixed with respect to the fixed plate 57 through the supporting body 55. Then, in the air cylinder 51, compressed air is introduced from an air compressor, which is not shown in the figure, to the air room 51a. Thus, as shown in FIG. 4B, air pressure of the compressed air presses the sliding rod 51b so that the sliding rod 51b protrudes and provides pressing force in the protruding direction. The protruding sliding rod 51b moves the movable plate 53 in an opposite direction to a direction of pressing force of the spring 54.

Hereafter, a position (a position shown in FIG. 4A) of the movable plate 53 before the compressed air is introduced, that is, before the sliding rod 51b protrudes is referred to as a top dead center. Meanwhile, a position (a position shown in FIG. 4B) where the movable plate 53 contact an upper end of the stopper 56 after the compressed air is introduced, that is, after the sliding rod 51b protrudes is referred to as a bottom dead center.

When the sliding rod 51b reaches the bottom dead center, the compressed air is released from the air room 51a to release the pressing force. Therefore, the sliding rod 51b returns to the top dead center together with the movable plate 53 by the pressing force of the spring 54.

The guide rod 52 is rigidly fixed in such a way that a longitudinal direction of the guide rod 52 is orthogonal to the fixed plate 57. In such a structure, the guide rod 52 guides the movable plate 53 in the longitudinal direction with keeping the movable plate 53 horizontal with respect to the fixed plate 57.

Thus, the movable plate 53 reciprocates between the top dead center and the bottom dead center without shaking. Then, as shown in FIG. 4B, the movable plate 53 presses the second reference plane 21 of the upper mold 20 in order to transform the lens material 43 into a shape of the optical lens 40 on the way from the top dead center to the bottom dead center. Meanwhile, the lens material 43 is placed on the lower mold 10 in such a way that the first reference plane 11 contacts the fixed plate 57.

Figures 4B, 4C:
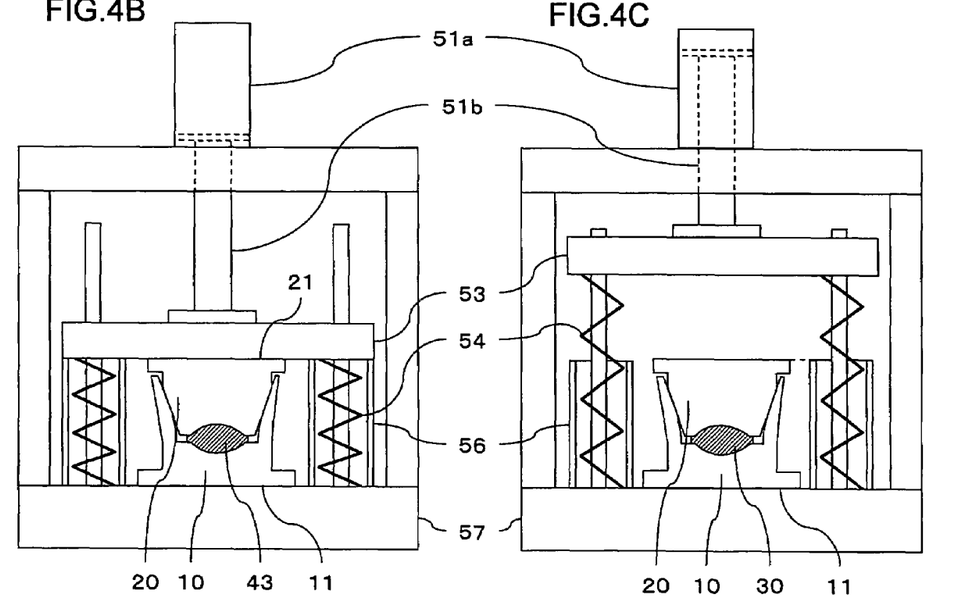
FIG. 4B is a diagram showing operation of the presser.
FIG. 4C is a diagram showing operation of the presser.

As shown in FIG. 4C, the spring 54 presses up the sliding rod 51b which has reached the bottom dead center and from which the pressing force has been released, back to the top dead center.

The stopper 56 sets the bottom dead center of the movable plate 53 as described above. Therefore, adjusting length of the stopper 56 changes the press stroke of the upper mold 20 with respect to the lower mold 10. Accordingly, it is possible to control thickness of the optical lens 30 to the desired amount only by replacing the stopper 56. In FIG. 4B, two stoppers 56 are provided. In this state, the stopper 56 keeps the movable plate 53 parallel to the fixed plate 57. This structure keeps the first reference plane 11 of the lower mold 10 parallel to the second reference plane 21 of the upper mold 20 so as to improve the centering accuracy.

Thus, the presser 50 molds the lens material 43 into the shape of the optical lens 40 with the single press stroke of the sliding rod 51b which is made by operation of the air cylinder 51.

Next, referring to FIG. 5, there will be described another embodiment of a presser which is applicable to a method for molding an optical lens according to the present invention.

Figure 5A:
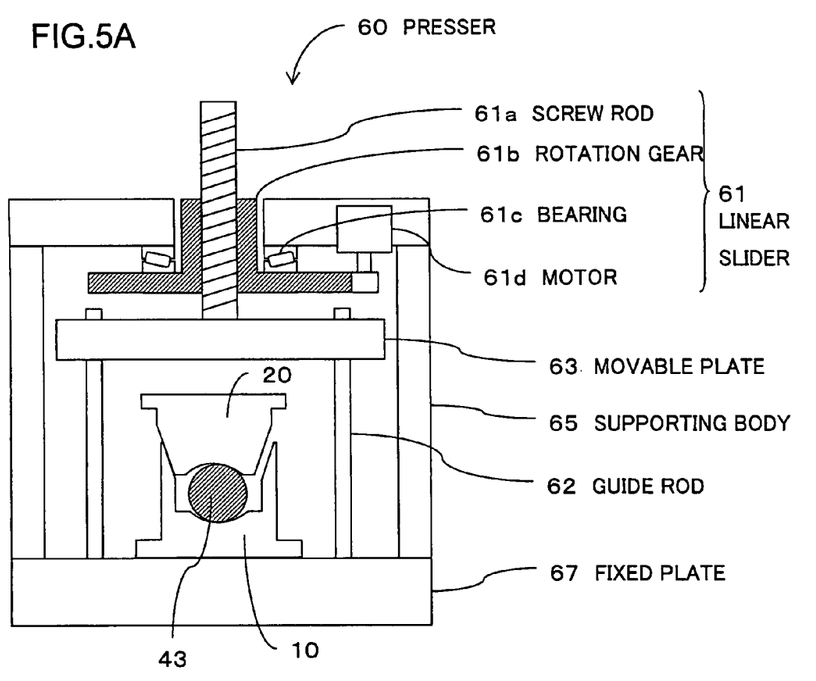
FIG. 5A shows another embodiment of a presser applicable to a method for molding an optical lens according to the present invention.

As shown in FIG. 5A, the presser 60 according to the embodiment includes a linear slider 61, a guide rod 62, a movable plate 63, a supporting body 65, and a fixed plate 67. The presser 60 with such a structure provides pressing force necessary to transform a heat-softened lens material 43. In addition, the movable plate 63 moves to follow shrinkage in the cooling process so that the optical lens 40 is molded with high accuracy.

The linear slider 61, which includes a screw rod 61a, a rotation gear 61b, a bearing 61c, and a motor 61d, is fixed with respect to the fixed plate 67 through the supporting body 65. The motor 61d is fixed to the supporting body 65. Moreover, the rotation gear 61b is rotatably attached to the supporting body 65 through the bearing 61c. The rotor in an end of the motor 61d meshes with the rotation gear 61b. Thus, the rotation gear 61b rotates in synchronization with rotation of the rotor.

The lateral surface of the screw rod 61a meshes with the inner peripheral surface of the rotation gear 61b, while the end of the screw rod 61a is fixed to the movable plate 63. Then, when the rotation gear 61b rotates, the screw rod 61a is moved in the longitudinal direction since the movable plate 63 and the guide rod 62 limit rotation of the screw rod 61a.

In this structure, the linear slider 61 vertically moves the movable plate 63 by a predetermined amount and speed depending on rotation angle and speed of the rotor of the motor 61d.

The guide rod 62 is rigidly fixed in such a way that a longitudinal direction of the guide rod 62 is orthogonal to the fixed plate 67. In such a structure, the guide rod 62 guides the movable plate 63 in the longitudinal direction with keeping the movable plate 63 horizontal with respect to the fixed plate 57.

The movable plate 63 is guided by the guide rod 62 in such a way to reciprocate in the vertical direction without shaking. Then, as shown in FIG. 5B, the movable plate 63 transforms the heat-softened lens material 43 and molds the lens material 43 into a shape of the optical lens 40.

Figure 5B:
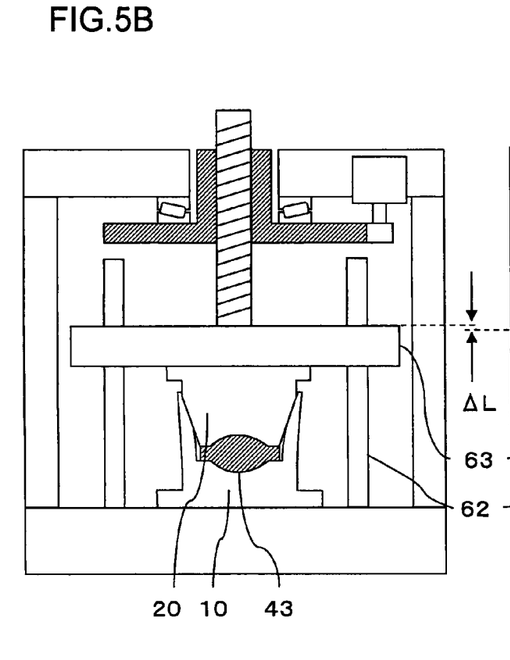
FIG. 5B is a diagram showing operation of the presser.
Figure 5C:
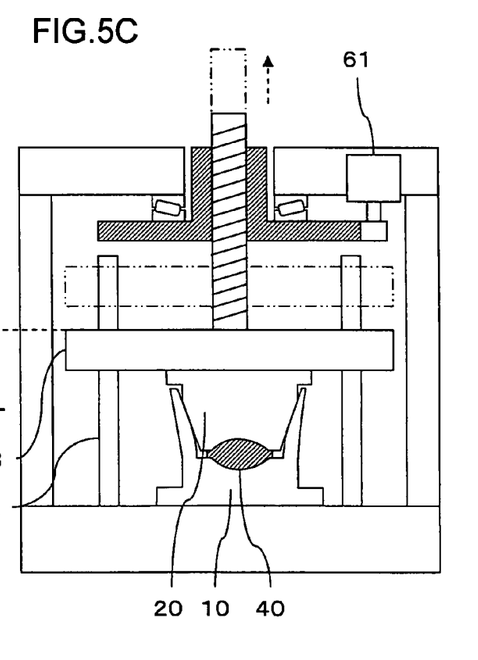
FIG. 5C is a diagram showing operation of the presser.

In addition, as shown in FIG. 5C, the movable plate 63 finely adjusts the press stroke by ΔL to follow thermal contraction of the lens material 43 in a cooling process by operation of the linear slider 61 so that the optical lens 40 is molded with high accuracy.

Then, as shown in FIG. 5C, when the lens material 43 is cooled enough, the movable plate 63 is moved as indicated by a dashed line. Accordingly, the optical lens 40 can be taken out of the lower mold 10 and the upper mold 20.

Moreover, FIGS. 5A-5C show an example where a press stroke of the movable plate 63 of the presser 60 is controlled by the rotation amount of the motor 61d. However, a movement sensor, which is not shown in the FIG., may be provided to detect movement amount of the movable plate 63 for feedback control of the press stroke.

The present invention with such structures in the embodiments described above provides the following effects. Centering is achieved by the tapered surfaces in the lower mold (the first mold) and the upper mold (the second mold). In addition, the press stroke of the upper mold with respect to the lower mold can be finely adjusted in a state where the tapered surfaces fit onto each other. Accordingly, a plurality of optical lenses with different thicknesses can be produced with a pair of the lower mold (the first mold) and the upper mold (the second mold).

Moreover, according to the present invention, immediately after a mold is closed, when a state of lens material changes from a high temperature state where the lens material is softened to a low-temperature state where the lens material solidifies, it is possible to finely adjust a press stroke of an upper mold corresponding to thermal contraction of the mold and the lens material in a state where the mold is closed. Therefore, centering accuracy of an optical lens, as well as accuracy in a thickness direction is improved.

A description has been given to examples where an optical component is an optical lens. However, the present invention is not limited to this. Besides, optical components to which the present invention is applied include a mirror frame which supports an optical lens, a prism, and so on.

The present invention can provide a mold and a method for molding an optical component, which improve centering accuracy of an optical lens, as well as accuracy in a thickness direction.

While the described embodiments represent the preferred forms of the present invention, it is to be distinctly understood that the present invention is not limited thereto but may be otherwise variously embodied within the spirit and scope of the following claims.

What is claimed is:

1. A mold for an optical component comprising:
   a first mold having a first mold curved surface that molds a first lens surface of the optical component;
   a second mold having a second mold curved surface that molds a second lens surface of the optical component;
   a first tapered surface which is rotationally symmetric about a first symmetry axis about which the first mold curved surface is rotationally symmetric; and
   a second tapered surface which is rotationally symmetric about a second symmetry axis about which the second mold curved surface is rotationally symmetric, the second tapered surface contacting the first tapered surface such that the first symmetry axis is aligned with the second symmetry axis,
   wherein a curved surface distance is a distance between the first mold curved surface and the second mold curved surface and a lens thickness is a distance between the first lens surface and the second lens surface, and
   wherein the first tapered surface is elastically transformable and the second tapered surface moves to a position where the curved surface distance is equal to the lens thickness, the second tapered surface elastically transforming the first tapered surface to mold the optical component.

2. The mold for the optical component as claimed in claim 1, wherein the first tapered surface is provided in a third mold which is detachably attached to the first mold.

3. The mold for the optical component as claimed in claim 2, wherein the first mold fits in the third mold with the tapered surface in the first mold in contact with the tapered surface in the third mold.

4. The mold for the optical component as claimed in claim 1, wherein a plurality of slits are formed on the first tapered surface.

5. The mold for the optical component as claimed in claim 1, wherein a plurality of protrusions which support the second tapered surface are arranged in the first tapered surface.

6. The mold for the optical component as claimed in claim 2, wherein a plurality of slits are provided in the first tapered surface.

7. The mold for the optical component as claimed in claim 3, wherein a plurality of slits are provided in the first tapered surface.

8. The mold for the optical component as claimed in claim 2, wherein a plurality of protrusions which support the second tapered surface are arranged in the first tapered surface.

9. The mold for the optical component as claimed in claim 3, wherein a plurality of protrusions which support the second tapered surface are arranged in the first tapered surface.

* * * * *